(12) United States Patent
McCollough et al.

(10) Patent No.: US 8,876,036 B2
(45) Date of Patent: Nov. 4, 2014

(54) RECONFIGURABLE ROTOR BLADE

(75) Inventors: James M. McCollough, Arlington, TX (US); Mark Wasikowski, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 147 days.

(21) Appl. No.: 13/698,702

(22) PCT Filed: Jul. 28, 2011

(86) PCT No.: PCT/US2011/045659
§ 371 (c)(1),
(2), (4) Date: Nov. 19, 2012

(87) PCT Pub. No.: WO2012/121748
PCT Pub. Date: Sep. 13, 2012

(65) Prior Publication Data
US 2013/0062456 A1 Mar. 14, 2013

Related U.S. Application Data

(60) Provisional application No. 61/450,426, filed on Mar. 8, 2011.

(51) Int. Cl.
*B64C 27/00* (2006.01)
*B64C 27/473* (2006.01)
*B64C 27/72* (2006.01)

(52) U.S. Cl.
CPC ....... *B64C 27/473* (2013.01); *B64C 2027/7222* (2013.01); *Y02T 50/34* (2013.01); *B64C 27/72* (2013.01)

USPC ............... 244/17.11; 244/17.25; 416/147

(58) Field of Classification Search
USPC .................................................. 244/17.11
See application file for complete search history.

(56) References Cited

U.S. PATENT DOCUMENTS

| | | | | |
|---|---|---|---|---|
| 2,103,740 A | * | 12/1937 | Algarsson | 416/51 |
| 2,584,663 A | | 2/1952 | Bensen | |
| 3,402,772 A | * | 9/1968 | Sobanik | 416/144 |
| 3,713,751 A | * | 1/1973 | Fradenburgh et al. | 416/87 |
| 4,291,235 A | * | 9/1981 | Bergey et al. | 290/55 |
| 4,746,272 A | * | 5/1988 | Noehren et al. | 416/134 A |

(Continued)

FOREIGN PATENT DOCUMENTS

GB 644478 A 10/1950

OTHER PUBLICATIONS

International Search Report and the Written Opinion of the International Searching Authority mailed by ISA/US on Dec. 23, 2011 for International Patent Application No. PCT/US2011/045659, 10 pages.

(Continued)

*Primary Examiner* — Christopher P Ellis
*Assistant Examiner* — Medhat Badawi
(74) *Attorney, Agent, or Firm* — James E. Walton; Damon R. Hickman

(57) ABSTRACT

A reconfigurable rotor blade system includes an internal mass that is configured to translate in order to produce a spanwise torsional twist of the rotor blade. An actuator is configured to selectively translate the mass so as to relocate a center of mass of the rotor blade. The torsional twist is selectively produced during operation of the rotorcraft.

23 Claims, 6 Drawing Sheets

(56) References Cited

U.S. PATENT DOCUMENTS

| | | | | |
|---|---|---|---|---|
| 5,137,228 | A * | 8/1992 | Vaughen | 244/17.25 |
| 5,505,589 | A * | 4/1996 | Bergey | 416/147 |
| 5,970,820 | A * | 10/1999 | Smith | 74/574.2 |
| 6,589,017 | B1 * | 7/2003 | Solheim | 416/87 |
| 7,828,523 | B2 | 11/2010 | Bonnet | |
| 2003/0223868 | A1 * | 12/2003 | Dawson et al. | 416/1 |
| 2006/0049302 | A1 * | 3/2006 | Kennedy et al. | 244/17.11 |
| 2007/0029403 | A1 * | 2/2007 | Hassan et al. | 239/171 |
| 2010/0143135 | A1 * | 6/2010 | Nies et al. | 416/147 |
| 2011/0002785 | A1 * | 1/2011 | Cawthorne et al. | 416/144 |
| 2011/0101171 | A1 * | 5/2011 | Phillips | 244/201 |
| 2011/0243736 | A1 * | 10/2011 | Bell | 416/132 R |

OTHER PUBLICATIONS

Extended European Search Report dated Jul. 16, 2014 from counterpart EP App. No. 11860353.9.

* cited by examiner

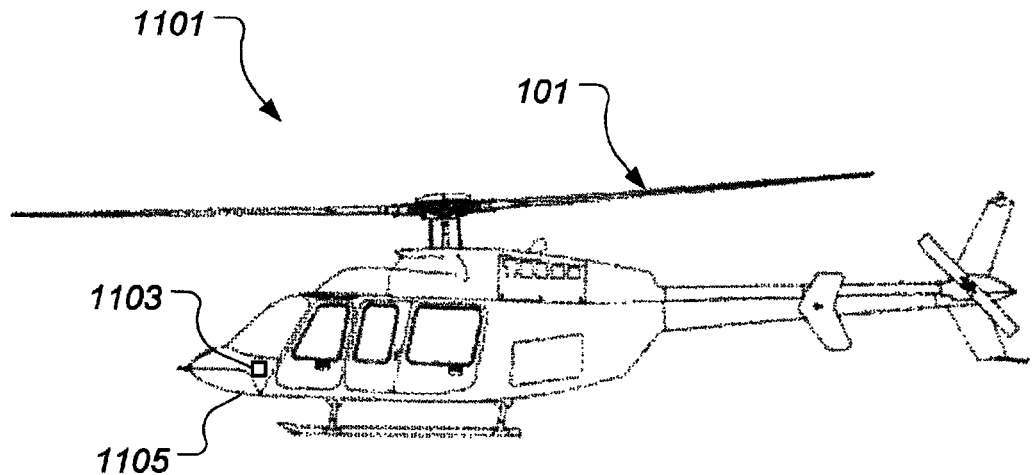
FIG. 11
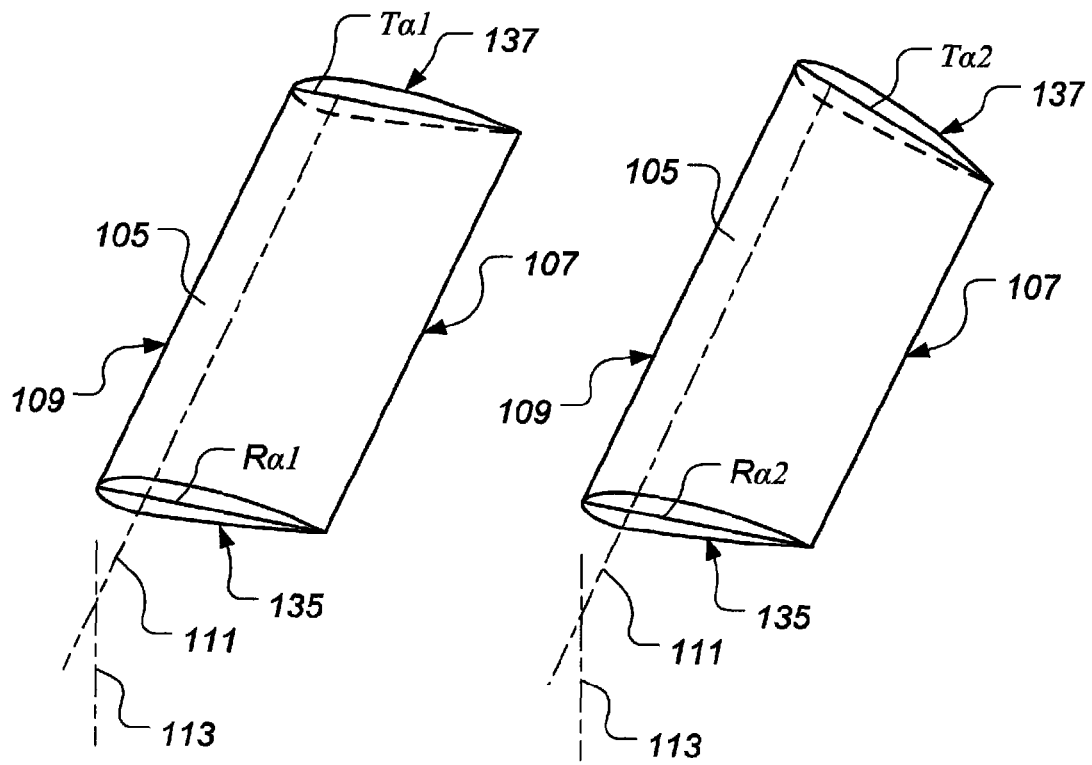
FIG. 12A                    FIG. 12B

_US 8,876,036 B2_

RECONFIGURABLE ROTOR BLADE

TECHNICAL FIELD

The present application relates to a reconfigurable rotor blade for a rotorcraft.

DESCRIPTION OF THE PRIOR ART

Typically, rotor blades are configured to provide optimal performance for a certain flight regime. For example, a rotor blade may be configured for optimal performance in hover modes, which may compromise performance in forward flight modes. Conversely, a rotor blade can be configured for optimal performance in forward flight modes, at the expense of performance in hover flight modes. Rotor blade design parameters that effect flight characteristics include airfoil shape, span, chord, twist, and dynamic properties.

Typically, rotor blades are controlled by a pilot through a mechanical system which enables the pilot to selectively control the pitch of each rotor blade. Such a mechanical system typically includes a swashplate with pitch links. A pitch link is coupled to each rotor blade so that an actuation of the swashplate selectively changes the pitch of one or more of the rotor blades. Selectively changing the pitch of each rotor blade allows the pilot to control the lift/thrust and direction of the rotorcraft.

Although there have been significant developments in rotor blade design, significant room for improvement remains.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

FIG. 11 is a side view of a rotorcraft having a reconfigurable rotor blade system according to the present application; and FIGS. 12A and 12B are schematic perspective views depicting torsional twist deflection in a rotor blade, according to the present application.

Figure 1:
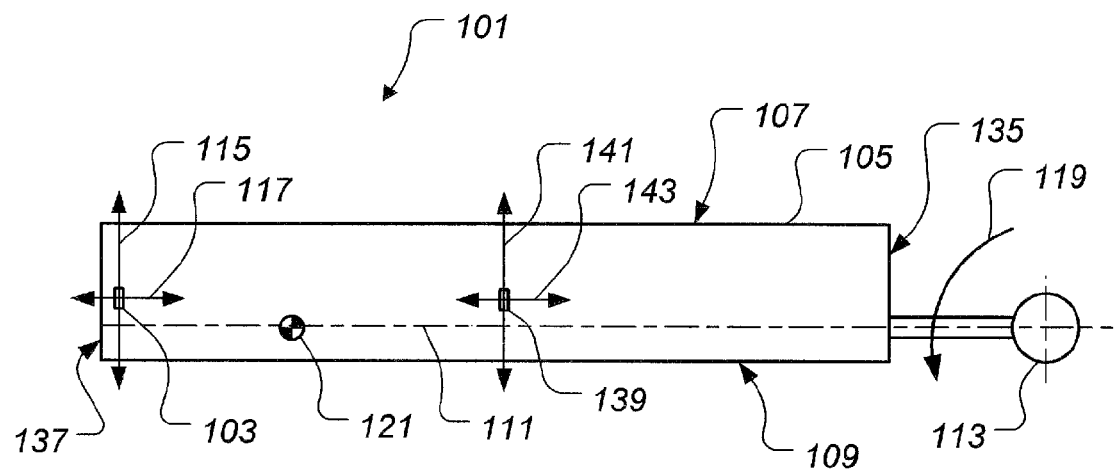
FIG. 1 is a schematic top view of a reconfigurable rotor blade according to the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application includes a reconfigurable rotor blade having an internal mass that is configured to dynamically translate during operation of the rotorcraft. Namely, the internal mass can be translated within the rotor blade in order to alter the dynamic response of the rotor blade so as to affect the rotor blade performance, vibration, acoustic signature, and fatigue life. The aforementioned features of the system are described further herein.

Referring to FIG. 1, a top schematic view of reconfigurable rotor system 101 is illustrated. Rotor blade 105 includes an airfoil shaped skin with a leading edge 109 and a trailing edge 107. Rotor blade 105 has a root end 135 and a tip end 137. System 101 includes an internal mass 103 that is configured to translate in a chordwise direction 115. In an alternative embodiment, internal mass can also translate in a spanwise direction 117. In one embodiment, system 101 also includes an internal mass 139 that is configured to translate in a chordwise direction 139 and/or a spanwise direction 141. During operation of the rotorcraft, a mast 113 provides torque to rotate rotor blade 105. Rotor blade 105 is weighted so that a centroid 121, otherwise referred herein as the physical center of mass, is approximately located about a ⅓ of the rotor blade spanwise distance from the tip end 137 and approximately ¼ of the chordwise distance from the leading edge 109. A nominal location of centroid 121 is preferably slightly forward of feathering axis 111. It should be appreciated that the system of the present application is suitable for rotor blades having a wide variety of centroid locations, as well as rotor blades having a variety of geometries. During operation, rotor blade 105 is rotated about mast 113 in a rotational direction 119.

Mass 103 is preferably located near tip end 137, while mass 139 is located near a mid-span portion of rotor blade 105. Mass 139 may be configured and translated similar to mass 103. In one embodiment, mass 103 is located near the tip end 137 so as to primarily produce twisting moments, while mass 139 is configured to provide dynamic tuning of rotor blade 105 so that rotor blade 105 can be operated over a large range of rotor blade speeds. It should be appreciated that all disclosure herein regarding the translation of mass 103 is also applicable to the translation of mass 139. More specifically, systems 501, 701, 801, 901, and 1001 may all be used in the translation of a tip end mass, such as mass 103, and a mid-span mass, such as mass 139, as well as a mass located in any other portion of rotor blade 105.

It should be appreciated that rotor blade 105 may have a built-in geometric twist, in that the angle of incidence of the airfoil shape varies from the root end 135 to the tip end 137. For example, rotor blade 105 may have built in geometric twist such that a pitch angle of the airfoil is larger near the root end 135 as compared to the pitch angle of the airfoil near the tip end. For clarity, rotor blade 105 is illustrated as having zero geometric twist.

Figure 2:
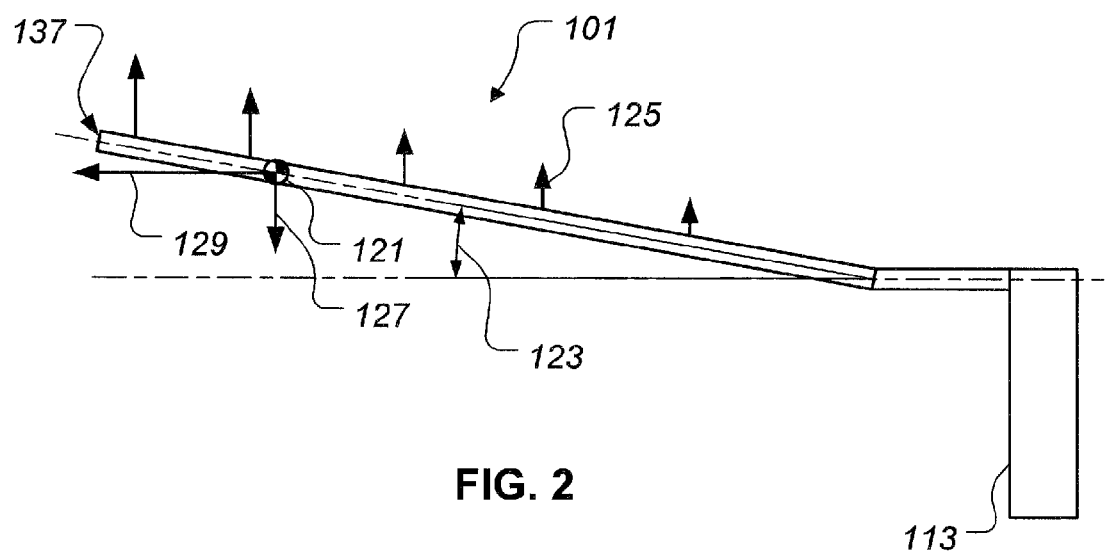
FIG. 2 is a schematic front view of the reconfigurable rotor blade according to the present application.

Referring to FIG. 2, certain aerodynamic and dynamic forces are schematically illustrated. During operation, lifting forces 125 are generated by the rotation of rotor blade 105. A coning angle 123 is at least partly caused by the flexing of the rotor blade 105 due to the lifting forces 125. The rotation of rotor blade 105 also generates a centrifugal force ("CF"). The CF can be resolved into a CF vertical force 127 and a CF horizontal force 129, each of the forces being shown through the centroid 121. The CF vertical force 127 acts downward to work against the coning of the rotor blade 105, while the CF horizontal force 129 pulls the rotor blade 105 outward, as shown in FIG. 2.

Figure 3:
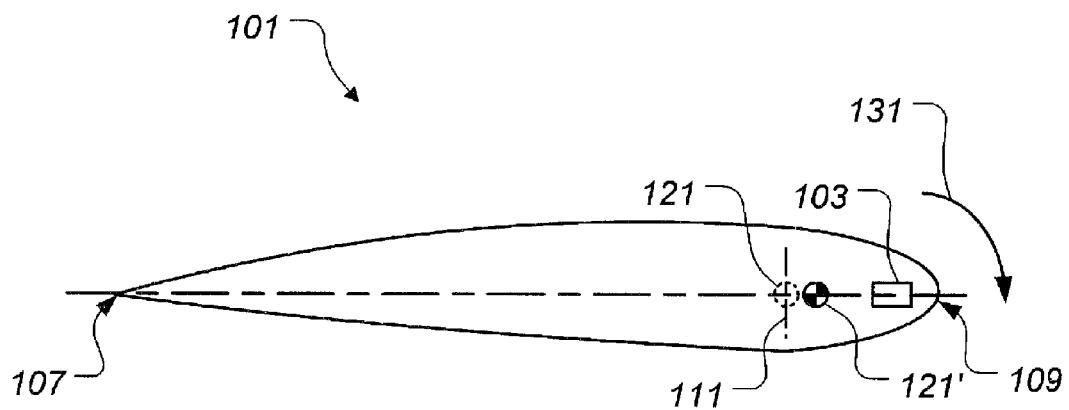
FIG. 3 is a schematic end view of the reconfigurable rotor blade according to the present application.
Figure 4:
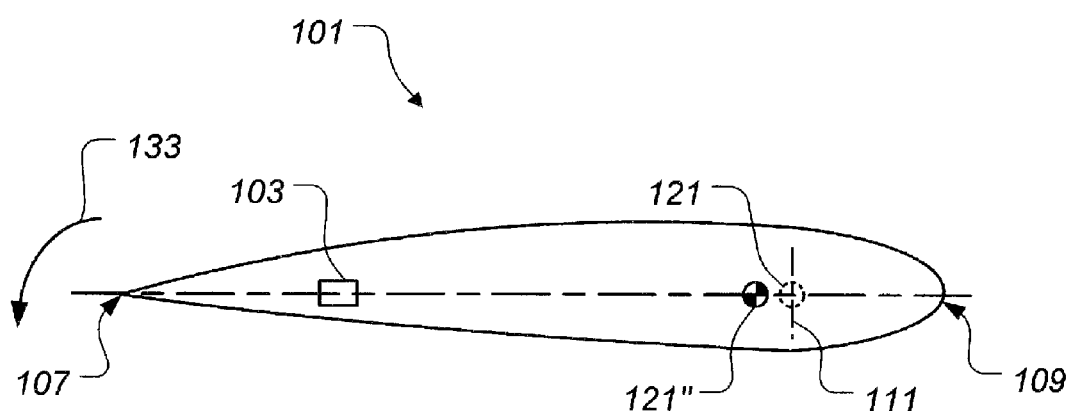
FIG. 4 is a schematic end view of the reconfigurable rotor blade according to the present application.

Referring now also to FIGS. 3 and 4, a schematic end view of system 101 is illustrated. System 101 is configured so that internal mass 103 may be translated to torsionally twist the rotor blade 105 during operation. Internal mass 103 can be translated towards the leading edge 109 in order to shift initial centroid 121 to a forward centroid 121'. The position of centroid 121' acts to move CF vertical force 127 towards the leading edge 109, thus producing a nose down twisting moment 131 on rotor blade 105. Similarly, internal mass 103 can be translated towards the trailing edge 107 in order to shift initial centroid 121 to an aft centroid 121". The position of centroid 121" acts to move CF vertical force 127 towards the trailing edge 107, thus producing a twisting moment 133 on rotor blade 105. As such, twisting moments 131 and 133 are selectively generated by moving internal mass 103 so as to twist the rotor blade 105 in order to selectively shape the rotor blade 105 in accordance with desired aerodynamic properties. For example, twisting moment 133 can be generated to twist rotor blade 105 so that rotor blade 105 has a more efficient aerodynamic shape during low speed flight, such as during a hover. Conversely, twisting moment 131 can be generated in order to twist rotor blade 105 so that rotor blade 105 has a more efficient shape during high speed forward flight. In the preferred embodiment, twisting moments 131 and 133 are generated by selectively positioning a mass, such as mass 103, during operation in order to optimize the aerodynamic shape of the rotor blade 105.

Referring briefly to FIGS. 12A and 12B, torsional deflection produced by a twisting moment is illustrated. The torsional deflection is a spanwise twist resulting from the twisting moment generated by the translation, or repositioning, of mass 103. Referring to FIG. 12A, a schematic of rotor blade 105 is illustrated. Rotor blade 105 has an angle of incidence $R\alpha 1$ near root end 135 and an angle of incidence of $T\alpha 1$ near tip end 137. Referring to 12B, rotor blade 105 is illustrated in a torsionally deflected state in response to a twisting moment generated by a translation of mass 103. In the illustration of FIG. 12B, torsional deflection is depicted by an increased an angle of incidence of $T\alpha 2$ near tip end 137 in FIG. 12B as compared to an angle of incidence $T\alpha 1$ near tip end 137 in FIG. 12A. In the illustrated embodiment, an angle of incidence $R\alpha 2$ near root end 135 in FIG. 12B is approximately similar to angle of incidence $R\alpha 1$ near root end 135 in FIG. 12A; however, other embodiments of rotor blade 105 allow for substantive change in angle of incidence near root end 135.

The magnitude of twisting moments 131 and 133 needed to generate the desired torsional deformation of rotor blade 105 depends at least partially on the torsional spring rate of the rotor blade 105. For example, a rotor blade 105 having a low torsional stiffness would require a lower twisting moment 131 and 133, as compared to a rotor blade 105 having a high torsional stiffness. Further, the weight of mass 103 is implementation specific and further depends on the amount of displacement of the mass 103. Twisting moments 131 and 133 typically cause a twisting deformation of rotor blade 105 such that the change in the angle of incidence of the airfoil shape is the greatest near the tip end 137 of the rotor blade 105.

Figure 5:
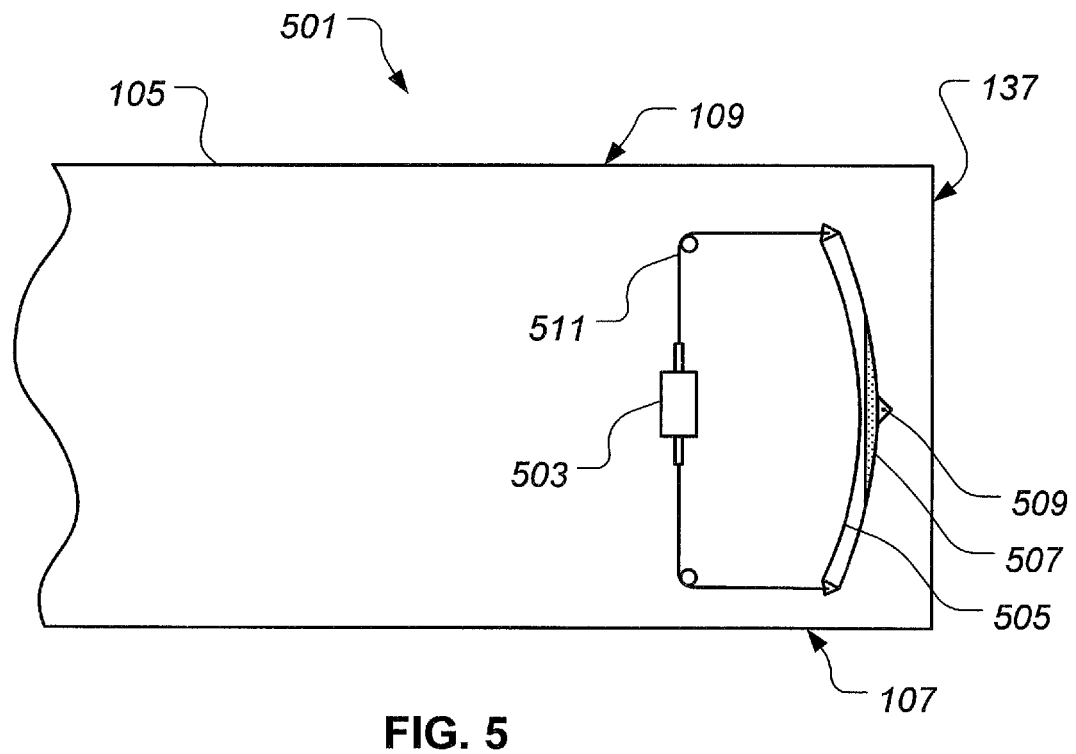
FIG. 5 is a schematic top view of a reconfigurable rotor blade according to the present application.
Figure 6:
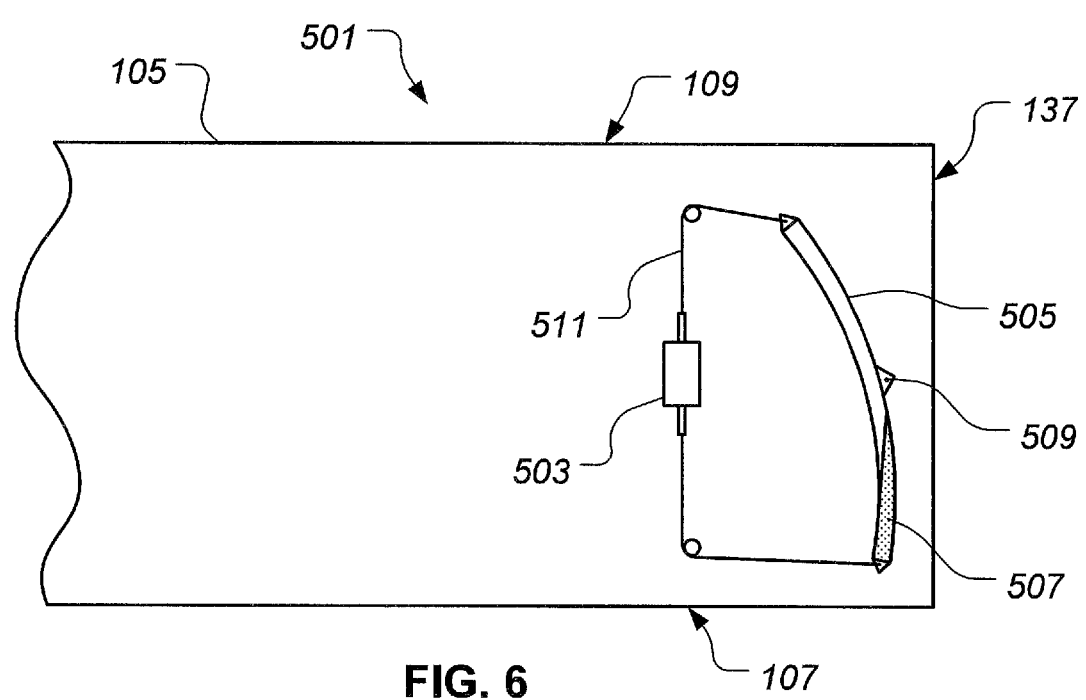
FIG. 6 is a schematic top view of a reconfigurable rotor blade according to the present application.

Referring now to FIGS. 5 and 6, a reconfigurable rotor system 501 is an illustrative embodiment of system 101. System 501 includes a tube 505 having a curvature such that a rotation of tube 505 about a pivot 509 facilitates displacement of a weighted fluid 507. The horizontal CG force 129 acts to translate the weighted fluid 507 toward the tip end 137. As such, the curved tube 505 can be rotated so as to displace weighted fluid 507 towards the leading edge 509, towards the trailing edge 107, or anywhere therebetween. Displacement of weighted fluid 507 acts to induce a twisting moment upon rotor blade 105 by changing the centroid location during operation. Weighted fluid 507 is preferably a high density liquid, but may also be a plurality of dense spherical balls which behave similar to a viscous fluid. An actuator 503 can be used to actuate a cable 511 which in turn rotates tube 505 about pivot 509. Furthermore, any type of appropriate actuator can be used to rotate tube 505. It should be appreciated that weighted fluid 507 is an exemplary implementation of mass 103 and mass 139, shown in FIG. 1.

Figure 7:
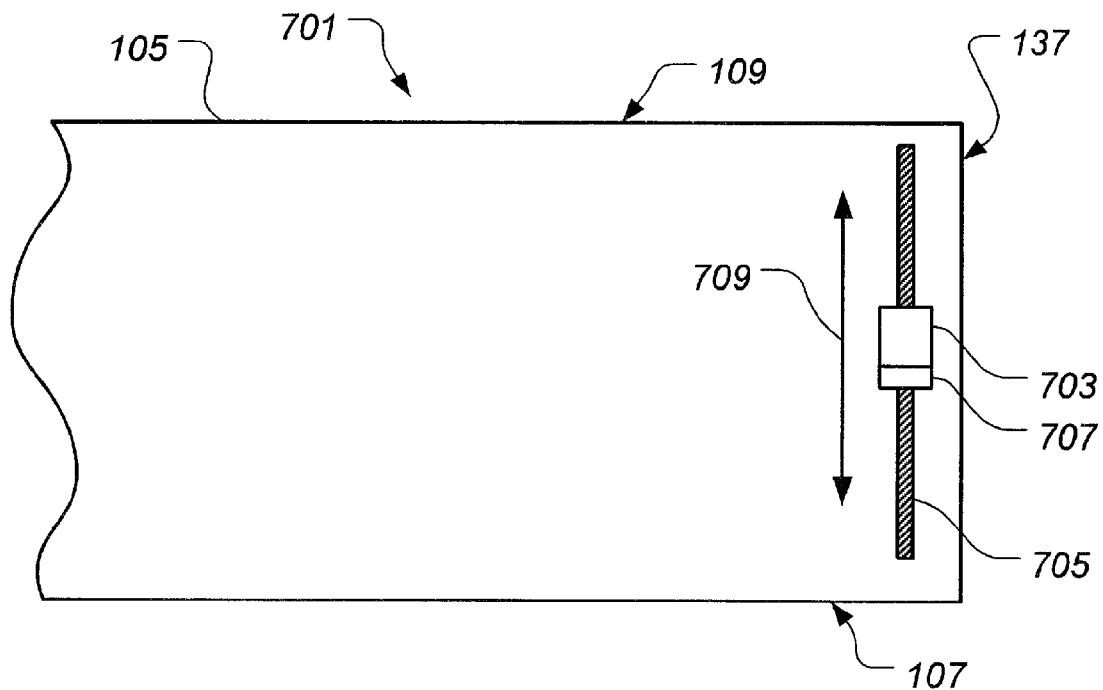
FIG. 7 is a schematic top view of a reconfigurable rotor blade according to the present application.

Referring now to FIG. 7, a reconfigurable rotor system 701 is another illustrative embodiment of system 101. System 701 includes a mass 703 and an actuator 707, the mass 703 and the actuator 707 being operably associated with a threaded shaft 705 in a ball-screw type configuration. Actuator 707 is selectively operated to controllably translate mass 703 along shaft 705 along a direction 709. Displacement of mass 703 acts to induce a twisting moment upon rotor blade 105 by changing the centroid location during operation. Although only one mass 703 is depicted, it should be appreciated that a plurality of masses 703 may be located on a single shaft 705. It should be appreciated that mass 703 is an exemplary implementation of mass 103 and mass 139, shown in FIG. 1. Further, it should be appreciated that shaft 705 may be oriented so that a mass, such as mass 703, translates in a spanwise direction 117. In one embodiment, shaft is oriented diagonally between a chordwise direction 115 and a spanwise direction 117 so that mass 703 is translated partly in a spanwise direction 117 and partly in a chordwise direction 115.

Figure 8:
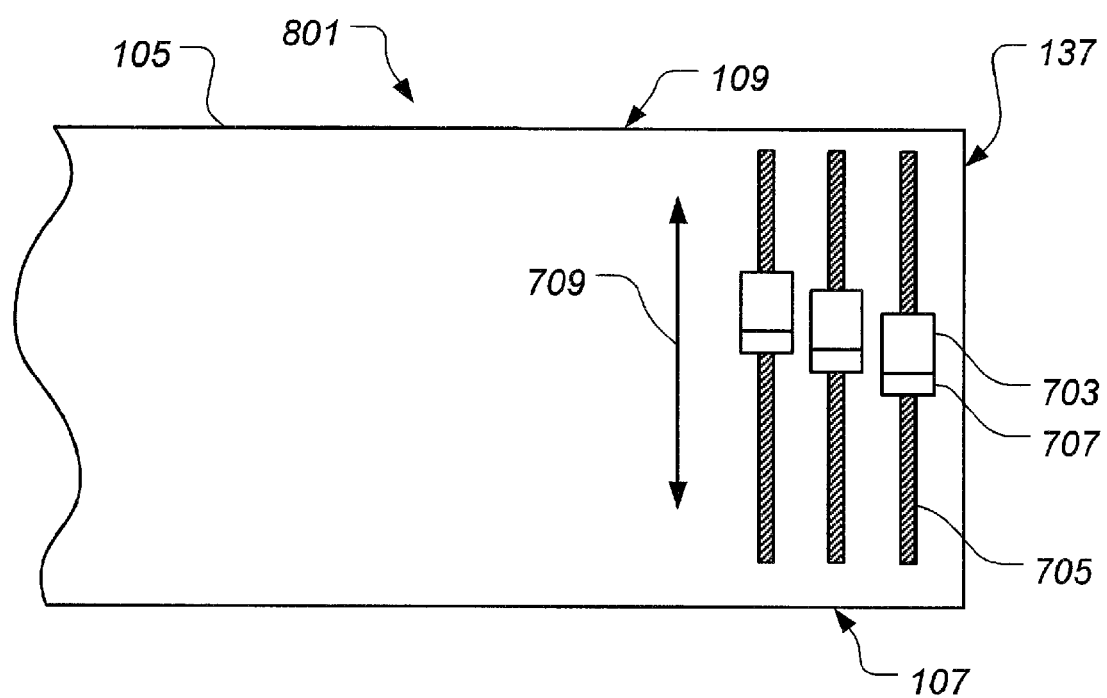
FIG. 8 is a schematic top view of a reconfigurable rotor blade according to the present application.

Referring now to FIG. 8, a reconfigurable rotor system 801 is another illustrative embodiment of system 101. System 801 includes a plurality of masses 703 and actuators 707, each being operably associated with a different threaded shaft 705. Each actuator 707 is selectively operated to controllably translate each mass 703 along each shaft 705. Net mass displacement from the combination of the masses 703 acts to induce a twisting moment upon rotor blade 105 by changing the centroid location during operation.

Figure 9:
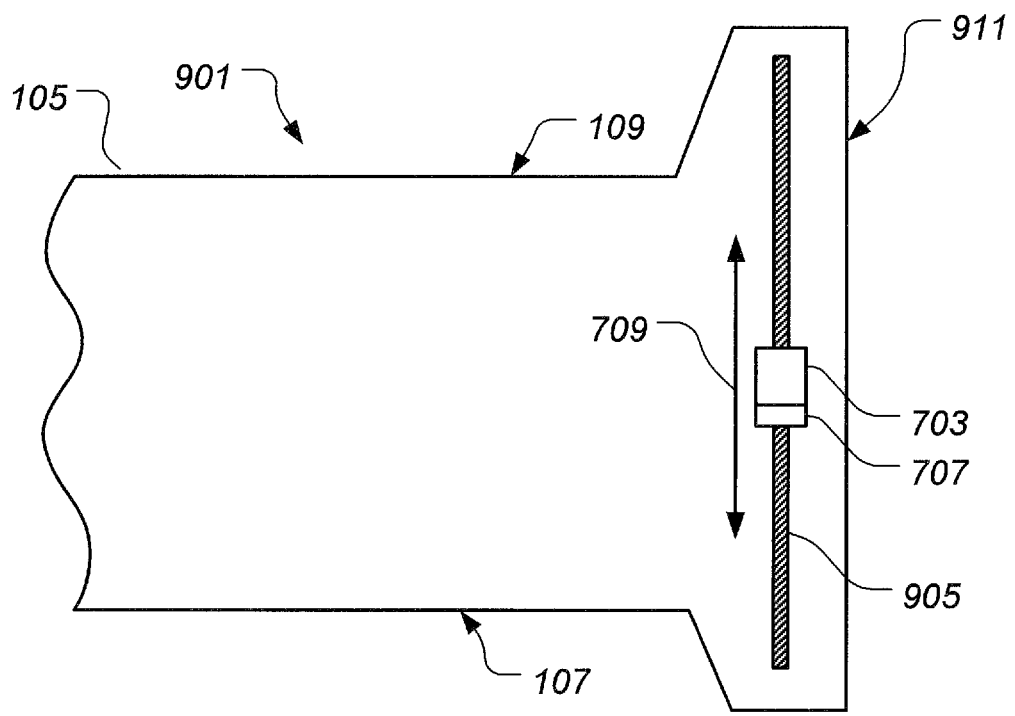
FIG. 9 is a schematic top view of a reconfigurable rotor blade according to the present application.

Referring now to FIG. 9, a reconfigurable rotor system 901 is another illustrative embodiment of system 101. System 901 includes a mass 703 and an actuator 707, the mass 703 and the actuator 707 being operably associated with a threaded shaft 905 in a ball-screw type configuration. Actuator 707 is selectively operated to controllably translate mass 703 along shaft 905 along a direction 709. Displacement of mass 703 acts to induce a twisting moment upon rotor blade 105 by changing the centroid location during operation. An extended tip 911 allows threaded shaft 905 to extend beyond the regular chord length of rotor blade 105 by extending beyond the leading edge 109 and trailing edge 107. Such a configuration allows for greater displacement of mass 703, thereby increasing the magnitude of the generated twisting moment.

Figure 10:
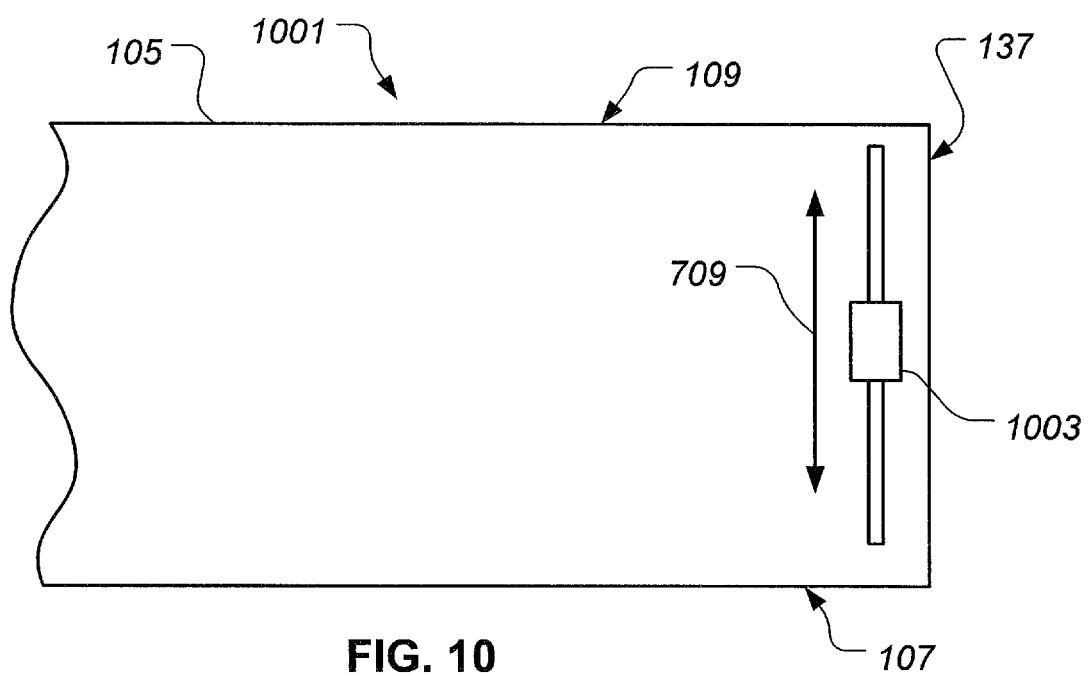
FIG. 10 is a schematic top view of a reconfigurable rotor blade according to the present application.

Referring now to FIG. 10, a reconfigurable rotor system 1001 is another illustrative embodiment of system 101. System 1001 includes a mass 1003 which is actuated by an actuator that is capable of quickly displacing mass 1003. In one embodiment, mass 1003 is displaced quickly enough to make displacements within a single revolution of rotor blade 105 around rotor mast 113. For example, the actuator may be an electromagnetic actuator. In one embodiment of system 1001, mass 1003 is actually a battery capable of storing energy to be used to power the actuator configured to translate mass 1003. The battery can store energy harnessed from the dynamic motion of the rotor or drive system. For example, a piezoelectric material, electromagnetic linear motor, or the like, may be used to harness energy generated by the rotorcraft dynamics. It should be appreciated that mass 1003 is an exemplary implementation of mass 103 and mass 139, shown in FIG. 1.

Referring to FIG. 11, a rotorcraft 1101 incorporating reconfigurable rotor system 101 is illustrated. A control system 1103 is carried by the rotorcraft. For example, control system 1103 can be carried in a fuselage portion 1105 of the rotorcraft 1101. Control system 1103 includes control logic and command capabilities to control the operation of system 101. Control system 1103 is preferably configured to selectively command translation of mass 103 and/or mass 139 in accordance with a desired twist of rotor blade 105. For example, control system 1103 may use one or more sensors to detect that rotorcraft 1101 is flying in a hover mode with little or no forward speed. In such a scenario, control system 1103 commands the location of mass 103 and/or mass 139 to be located towards the trailing edge 107 of rotor blade 105, thereby inducing a twisting moment 133 (shown in FIG. 4) so as to reconfigure rotor blade 105 for hover efficiency. Similarly, control system 1103 may use one or more sensors to detect that rotorcraft 1101 is flying in a forward flight mode, approximately 60 knots or greater. In such a scenario, control system 1103 commands the location of mass 103 and/or mass 139 to be located towards the leading edge 109 of the rotor blade 105, thereby inducing a twisting moment 131 (shown in FIG. 3) so as to reconfigure rotor blade 105 for forward flight efficiency. In an alternative embodiment, a pilot can reconfigure rotor blade 105 for hover efficiency or forward flight efficiency by controlling the location of mass 103 and/or mass 139, as described herein.

Control system 103 can also include control logic for adjusting the location of mass 103 and/or mass 139, in order to reduce or tailor vibration. As such, one or more sensors that detect vibration, such as an accelerometer, can communicate with control system 103. System 103 is able to dynamically balance the rotor blades 105 during operation by translating at least one of mass 103 and mass 139. For example, a single rotor blade 105 may be producing an undesired vibration by being having a different centroid location than the other rotor blades. System 103 is able to translate mass 103 and/or mass 139 in direction 115 and/or direction 117, so as to relocate the centroid. Further, a single rotor blade 105 may have an aerodynamic anomaly, as compared to the other rotor blades. System 103 is configured to detect such an anomaly through vibration detection and translate mass 103 and/or mass 139 to compensate, thereby negating the irregular vibration produced by the aerodynamic anomaly. In another embodiment, the rotor craft 1101 may be configured to operate at a variety of RPM's, as such, system 101 can function to adjust the dynamics of the rotor blades 105 which may be dependent upon the RPM which the rotor blades 105 are being rotated around the mast 113. In one embodiment, mass 103 is dedicated to controlling rotor blade twist, while mass 139 is dedicated to treating vibration. In another embodiment, mass 103 is dedicated to controlling rotor blade twist, while mass 139 is dedicated to mass balancing rotor blade 105 so as to optimize the dynamics of rotor blade 105 in accordance with the present rotor blade speed (RPM). Control system 103 can also include control logic for adjusting the location of mass 103 and/or mass 139, in order to reduce acoustic signature of rotorcraft 1101. For example, rotorcraft 1101 may be operating in an area of which it is desirable to reduce acoustic signature of the rotorcraft. In such a situation, control system 103 can be configured to translate mass 103 and/or mass 139 so that rotor blade 105 produces a low acoustic signature.

In one embodiment, the system 101 acts to merely supplement the pitch control provided by a conventional swashplate and pitch control mechanism. Supplementing the conventional swashplate and pitch control acts to reduce loading and stroke distance, thereby enabling swashplate and pitch controls to be sized accordingly. In such an embodiment, a control input is made by a pilot, or unmanned control system, to increase or decrease the pitch of one or more rotor blades 105. Upon such a control input to change the lift of a rotorblade, the swashplate link functions to perform part of the change in lift by changing the pitch of rotor blade 105, while system 101 functions to perform part of the change in lift by changing the twist of the rotor blade 105.

However, system 101 may be configured to replace a conventional swashplate and pitch control mechanism. In such an embodiment, each rotor blade 105 may be coupled to the rotor hub in a manner that does not require pitch change of the rotor blade approximate to the rotor hub itself. In such a configuration, all the necessary pitch control of the rotor blades occurs through controlling the location of mass 103 and/or mass 139. For example, a collective input by a pilot, or unmanned system, causes mass 103 and/or mass 139 in each rotor blade 105 to simultaneously translate towards the trailing edge 107 of each rotor blade 105, thereby causing the leading edge 109 of the rotor blade 105 to torsionally twist up, thereby increasing the lift of each rotor blade 105. Similarly, system 101 may be configured so that a cyclic input by the pilot acts to selectively translate mass 103 and/or mass 139 in the rotor blades 105 at certain rotational positions within a single rotation of each rotor blade 105 about the rotor mast 113. For example, mass 103 and/or mass 139 may be quickly translated to torsional twist and untwist the rotor blades 105 so as to increase lift of each rotor blade 105 only on the right side of the rotorcraft, thereby causing the rotorcraft to pitch to left.

It should be appreciated that mass 103, 139, 703, and 1003 are preferably of a dense material, such as a metal. For example, the mass may be a lead member. However, masses 103, 139, 703, and 1003 may be any material, geometry, and volume capable of providing significant movement of centroid 121 when the mass is translated.

The system of the present application provides significant advantages, including: (1) providing the ability to change the shape of a rotor blade during operation of the aircraft; (2) providing a system that can automatically change the shape of a rotor blade in order to optimize the shape of the rotor blade for hover flight; (3) providing a system that can automatically change the shape of a rotor blade in order to optimize the shape of the rotor blade for forward flight; (4) providing a system for changing the lift of rotor blade during flight without the use of a conventional swashplate mechanism; (5) providing a system for changing the lift of rotor blade during flight which can supplement a conventional swashplate mechanism, thereby reducing the size of the swashplate mechanism; (5) providing a system for reducing vibration in a rotor blade by changing the shape of the rotor blade during flight; and (6) providing a system for changing the mass balancing of a rotor blade during flight in order to reduce vibration and the acoustic signature of the rotor blade.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A reconfigurable rotor blade system for a rotorcraft, the reconfigurable rotor blade system comprising:
   a rotor blade; and
   a mass located within the rotor blade;
   an actuator configured to selectively translate the mass primarily in a chordwise direction, so as to relocate a center of mass of the rotor blade;
   wherein a translation of the internal mass induces a spanwise twist in the rotor blade.

2. The reconfigurable rotor blade system according to claim 1, wherein the internal mass is located near a tip end of the rotor blade.

3. The reconfigurable rotor blade system according to claim 1, wherein the internal mass is located near a mid-span portion of the rotor blade.

4. The reconfigurable rotor blade system according to claim 1, wherein the spanwise twist includes a larger change in airfoil angle of attack at a tip end of the rotor blade as compared to a root end of the rotor blade.

5. The reconfigurable rotor blade system according to claim 1, wherein the mass is coupled to a threaded shaft oriented primarily in the chordwise direction, and wherein the actuator is configured to translate the mass along the threaded shaft.

6. The reconfigurable rotor blade system according to claim 1, wherein the mass is coupled to a threaded shaft and wherein the actuator is configured to translate the mass along the threaded shaft.

7. The reconfigurable rotor blade system according to claim 1, further comprising:
   a curved tube configured to house the mass;
   wherein the actuator is configured to rotated the curved tube, thereby causing the mass located within the tube to translate within the tube.

8. The reconfigurable rotor blade system according to claim 1, wherein the mass is a liquid.

9. The reconfigurable rotor blade system according to claim 1, wherein the mass is a plurality of spherical balls.

10. The reconfigurable rotor blade system according to claim 1, wherein the rotor blade includes an extended tip portion that extends beyond a regular chord length of the rotor blade so as to provide an extended displacement length in the chordwise direction for the mass.

11. The reconfigurable rotor blade system according to claim 1, wherein the actuator is configured to translate the mass within a single revolution of the rotor blade about a rotor mast, during operation of the rotorcraft.

12. The reconfigurable rotor blade system according to claim 1, wherein the mass is a battery, the battery being configured to store energy for the actuator.

13. A system configured to selectively change a twist profile of a rotor blade, the system comprising:
   a mass located within the rotor blade;
   an actuator configured to selectively translate the mass primarily in a chordwise direction, so as to relocate a center of mass of the rotor blade;
   a control system carried by an aircraft, the control system being configured to translate the internal mass to induce a spanwise twist in the rotor blade.

14. The system according to claim 13, wherein the control system is configured to translate the internal mass so as to induce a spanwise twist in the rotor blade so the aerodynamics of the rotor blade are optimized for a hover flight mode.

15. The system according to claim 13, wherein the control system is configured to translate the internal mass so as to induce a spanwise twist in the rotor blade so that the aerodynamics of the rotor blade are optimized for a forward flight mode.

16. The system according to claim 13, wherein the control system is configured to translate the internal mass so as to induce a spanwise twist in the rotor blade automatically upon receiving information from a sensor regarding forward flight speed.

17. The system according to claim 13, wherein the control system is configured to automatically translate the internal mass so as to induce a spanwise twist in the rotor blade in order to reduce a vibration in the aircraft.

18. The system according to claim 13, wherein the control system is configured to automatically translate the internal mass so as to induce a spanwise, twist in the rotor blade in order to reduce an external acoustic signature of the aircraft.

19. A method of flying a rotorcraft, the rotorcraft having a rotor blade, the method comprising:
   generating a change in aerodynamic lift properties in the rotor blade by selectively translating a mass in a chordwise direction, the mass being located within the rotor blade;

wherein the selectively translating the mass moves a center of mass of the rotor blade at least in a chordwise direction.

20. The method according to claim 19, wherein the step of generating a change in aerodynamic lift properties in the rotor blade is in response to an increase in forward flight speed of the rotorcraft.

21. The method according to claim 19, wherein the step of generating a change in aerodynamic lift properties in the rotor blade is in response to a decrease in forward flight speed of the rotorcraft.

22. The method according to claim 19, further comprising:
actuating a swashplate mechanism to change a pitch of the rotor blade;
wherein the step of generating a change in aerodynamic lift properties in the rotor blade by selectively translating a mass located within the rotor blade, acts to supplement the change in pitch of the rotor blade from the actuation of the swashplate mechanism by altering a spanwise twist of the rotor blade.

23. The method according to claim 19, wherein the step of generating the change in aerodynamic lift properties in the rotor blade by selectively translating the mass in the chordwise direction, the mass being located within the rotor blade, creates a twisting moment so as to change a twist profile of the rotor blade.

* * * * *